United States Patent [19]
Nimishakvi et al.

[11] Patent Number: 5,761,465
[45] Date of Patent: Jun. 2, 1998

[54] SYSTEM FOR COUPLING ASYNCHRONOUS DATA PATH TO FIELD CHECK CIRCUIT OF SYNCHRONOUS DATA PATH WHEN THE ASYNCHRONOUS DATA PATH COMMUNICATING DATA IN SYNCHRONOUS FORMAT

[75] Inventors: Hanumanthrao V. Nimishakvi, Fremont; Kameswaran Sivamani, Sunnyvale, both of Calif.

[73] Assignee: Cirrus Logic, Inc., Fremont, Calif.

[21] Appl. No.: 625,661

[22] Filed: Mar. 29, 1996

[51] Int. Cl.$^6$ .................................................. G06F 11/00
[52] U.S. Cl. ........................ 395/311; 371/49.1; 370/466
[58] Field of Search ............................. 370/248, 466, 370/282; 371/20.5, 22.1, 25.1, 49.1, 53; 395/311

[56] References Cited

U.S. PATENT DOCUMENTS

| | | | |
|---|---|---|---|
| 3,999,163 | 12/1976 | Levy et al. | 395/182.03 |
| 4,007,448 | 2/1977 | Sergeant et al. | 395/856 |
| 4,700,358 | 10/1987 | Duncanson et al. | 371/49.1 |
| 4,817,147 | 3/1989 | Gorniak et al. | 370/282 |
| 5,107,507 | 4/1992 | Bland et al. | 371/49.1 |
| 5,230,002 | 7/1993 | Yamashita et al. | 371/37.07 |

*Primary Examiner*—Moustafa M. Meky
*Attorney, Agent, or Firm*—Victor Okumoto; Frank D. Nguyen; J. P. Violette

[57] ABSTRACT

A data communication circuit of a computer system, includes transmitter and receiver circuits each having first and second data paths for respectively communicating synchronously and asynchronously formatted data on an alternatively selected basis, and a control circuit for controlling such communications. Included in the first data paths of the transmitter and receiver circuits are certain field check generating or error checking circuitry which are switchably coupled by their respective control circuits to their corresponding second data paths when synchronously formatted data is being asynchronously communicated through the second data paths.

18 Claims, 6 Drawing Sheets

SYSTEM FOR COUPLING ASYNCHRONOUS DATA PATH TO FIELD CHECK CIRCUIT OF SYNCHRONOUS DATA PATH WHEN THE ASYNCHRONOUS DATA PATH COMMUNICATING DATA IN SYNCHRONOUS FORMAT

FIELD OF THE INVENTION

This invention relates in general to computer systems and in particular, to data communication circuits of computer systems which switchably communicate frames of data through one or the other of two data paths configured for different protocol modes.

BACKGROUND OF THE INVENTION

A data communication circuit facilitates transfers of data between a computer system and one or more other computer systems or peripheral devices. To facilitate bidirectional communication, the data communication circuit generally includes separate transmitter and receiver circuits. To facilitate synchronous and asynchronous communication, the transmitter and receiver circuits may each include selectable data paths respectively configured for synchronous and asynchronous protocol communication.

Sometimes it is desirable to communicate synchronously formatted data through the asynchronous data path instead of through the synchronous data path of the transmitter or receiver circuit. In such a situation, the transmitting or receiving computer system must condition the data by performing certain functions in software, which are normally performed by hardware in the synchronous data path of the transmitter or receiver circuit. For examples, the transmitting computer system conventionally generates and appends check fields to the data when transmitting synchronously formatted data through the asynchronous data path of the transmitter circuit; and the receiving computer system conventionally performs error checking on the data when receiving synchronously formatted data from the asynchronous data path of the receiver circuit.

The software execution time to perform such functions is significant. Thus, the time required to communicate synchronously formatted data through the asynchronous data path is generally much longer than the time required to communicate such data through the synchronous data path. Also, while performing such data conditioning functions, a controlling processor of the transmitting or receiving computer system is kept from performing other important tasks. Further, additional memory resources are required for accomodating such conditioning functions, adding to system memory resource requirements.

Accordingly, it is an object of the present invention to provide improved synchronous and asynchronous data path structures that cost effectively reduce the software execution time and memory resource requirements for selectively communicating synchronously formatted data through an asynchronous data path.

SUMMARY OF THE INVENTION

This and additional objects are accomplished by the various aspects of the present invention, wherein, briefly stated, one aspect is a data communication circuit which reduces the software execution time and memory requirements for interfacing with it by sharing certain hardware between alternatively selectable first and second data paths of the data communication circuit. The first data path is configured for communicating data in a synchronous data link control mode, and the second data path is configured for communicating data in an asynchronous data link control mode. A check field generating circuit is included in the first data path, and is switchably coupled to the second data path so that it can be shared with the second data path when the second data path is asynchronously communicating data formatted in a synchronous data link control format. A control means is also included in the data communication circuit for selectively passing communication data through either the first or second data path, and switchably coupling the check field generating circuit to the second data path when the second data path is asynchronously communicating data formatted in a synchronous data link control format.

Another aspect is a computer system comprising a processor, and a data communication circuit coupled to the processor through a data bus, wherein the data communication circuit includes a first data path configured for communicating data in a synchronous data link control mode, the first data path including a check field generating circuit; a second data path configured for communicating data in an asynchronous data link control mode, the second data path switchably coupled to the check field generating circuit; and control means coupled to the first and second data paths, for selectively passing communication data through either the first or second data path, and switchably coupling the second data path to the check field generating circuit of the first data path when the second data path is asynchronously communicating data formatted in a synchronous data link control format.

Additional objects, features and advantages of the various aspects of the present invention will be apparent from the following description of its preferred embodiments, which description should be taken in conjunction with the accompanying drawings.

DETAILED DESCRIPTION OF THE PREFERRED EMBODIMENTS

Figure 1:
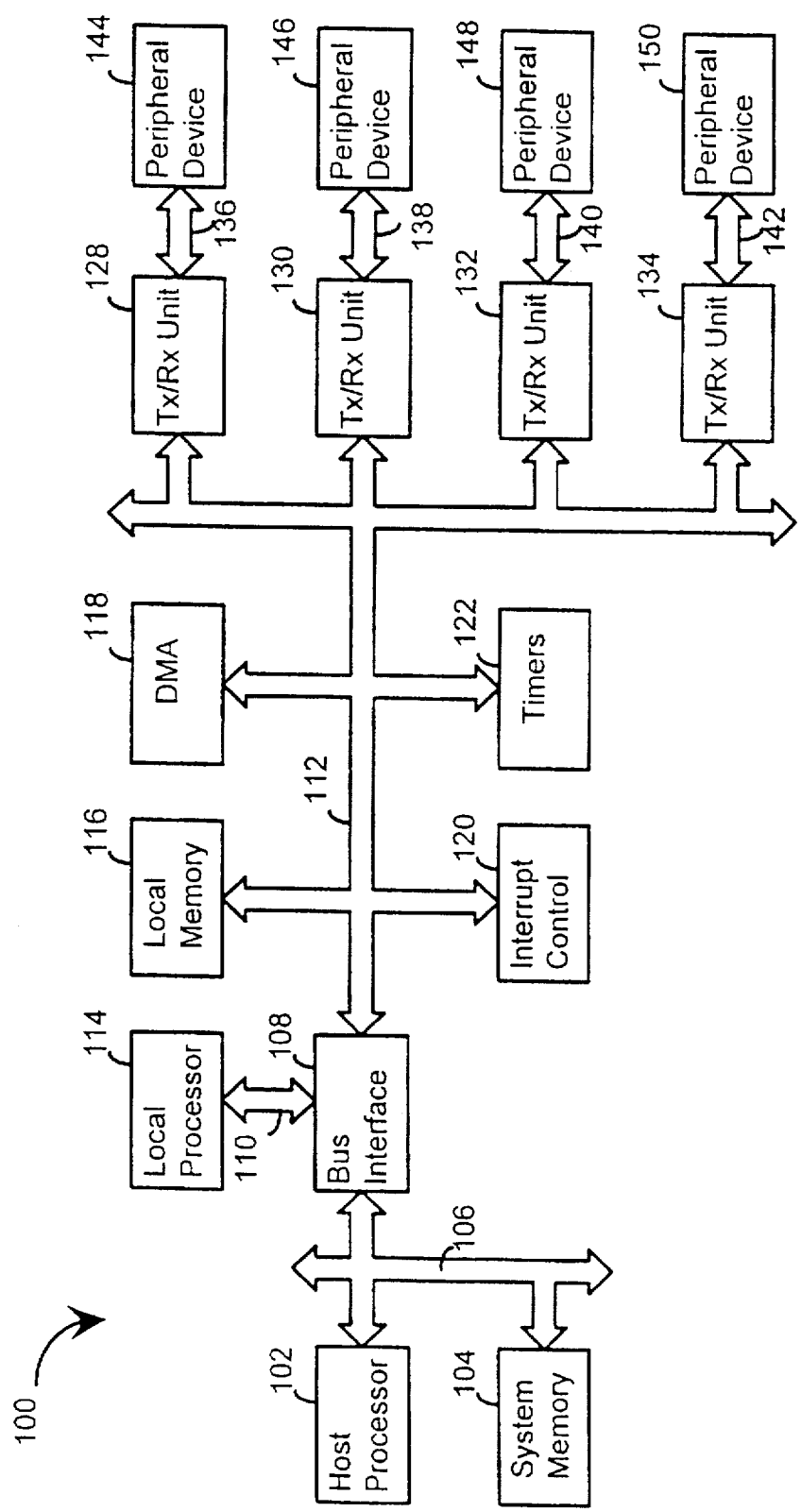
FIG. 1 illustrates, as an example, a block diagram of a computer system including one or more data communication circuits utilizing aspects of the present invention.

FIG. 1 illustrates, as an example, a block diagram of a computer system 100 including at one end, a processor 102 and a system memory 104 connected to a system bus 106 for communicating parallel transferred data, and at another end, peripheral devices 144–150 connected to corresponding serial communication channels 136–142 for communicating serially transferred data. The processor 102 may be any one of a number of commercially available processors such as those marketed by Intel Corp. or Motorola Inc. The system memory 104 may be any one or more of a number of solid state memory devices such as DRAMs, SRAMs, or EEPROMs. The peripheral devices may be any one of a number of serially communicating devices such as a printer, a modem, or another computer system communicating with the computer system 100 through, for example, a local area network (LAN).

A bus interface 108 facilitates the communication of parallel transferred data between the system bus 106, a local processor bus 110, and a local bus 112. A local processor 114 is connected to the local processor bus 110 for off-loading certain communication control tasks from the processor 102. A number of circuits such as, for examples, a local memory 116 for storing certain device status registers and/or data, a direct memory access (DMA) controller unit 118, an interrupt control unit 120, a timer unit 122, and a plurality of data communication circuits 128–134 are connected to the local bus 112. Except for the data communication circuits 128–134, each of these devices are generally of conventional design and function.

The bus interface 108 generally includes arbiter circuitry (not shown) in addition to interface circuitry (not shown) for communicating with the system bus 106, the local processor bus 110, and the local bus 112. The local processor 114 generally includes its own on-chip program ROM and data RAM to perform a number of tasks including programming data communication circuits 128–134 to transmit data with selected protocols, performing certain buffer management functions such as maintaining a data buffer pool in the system memory 104 or the local memory 116, setting up the DMA controller unit 118 to transfer data in either direction between the data buffer pool and the data communication circuits 128–134, and responding to certain interrupts such as those generated in response to the data buffer pool being fill or empty. Additionally, the local processor 114 may also perform compression/decompression of outgoing/incoming data frames, and data encryption/decryption tasks. The local memory 116 generally includes a number of memory mapped registers such as device status registers for the system memory 104, the local memory 116, the DMA controller unit 118, the interrupt control unit 120, the timer unit 122, the data communication circuits 128–134, and the serial communication channels 136–142.

The data communication circuits 128–134 operate in conjunction with the DMA controller unit 118 and the local processor 114 to transmit data frames stored in the data buffer pool of the system memory 104 or the local memory 116 to the peripheral devices 144–150, and to receive data frames from the peripheral devices 144–150 and store them in the data buffer pool of the system memory 104 or the local memory 116. Each data communication circuit (e.g., 128) is dedicated to servicing a corresponding serial communication channel (e.g., 136), which in turn, may service one or more corresponding peripheral devices (e.g., 144).

Figure 4:
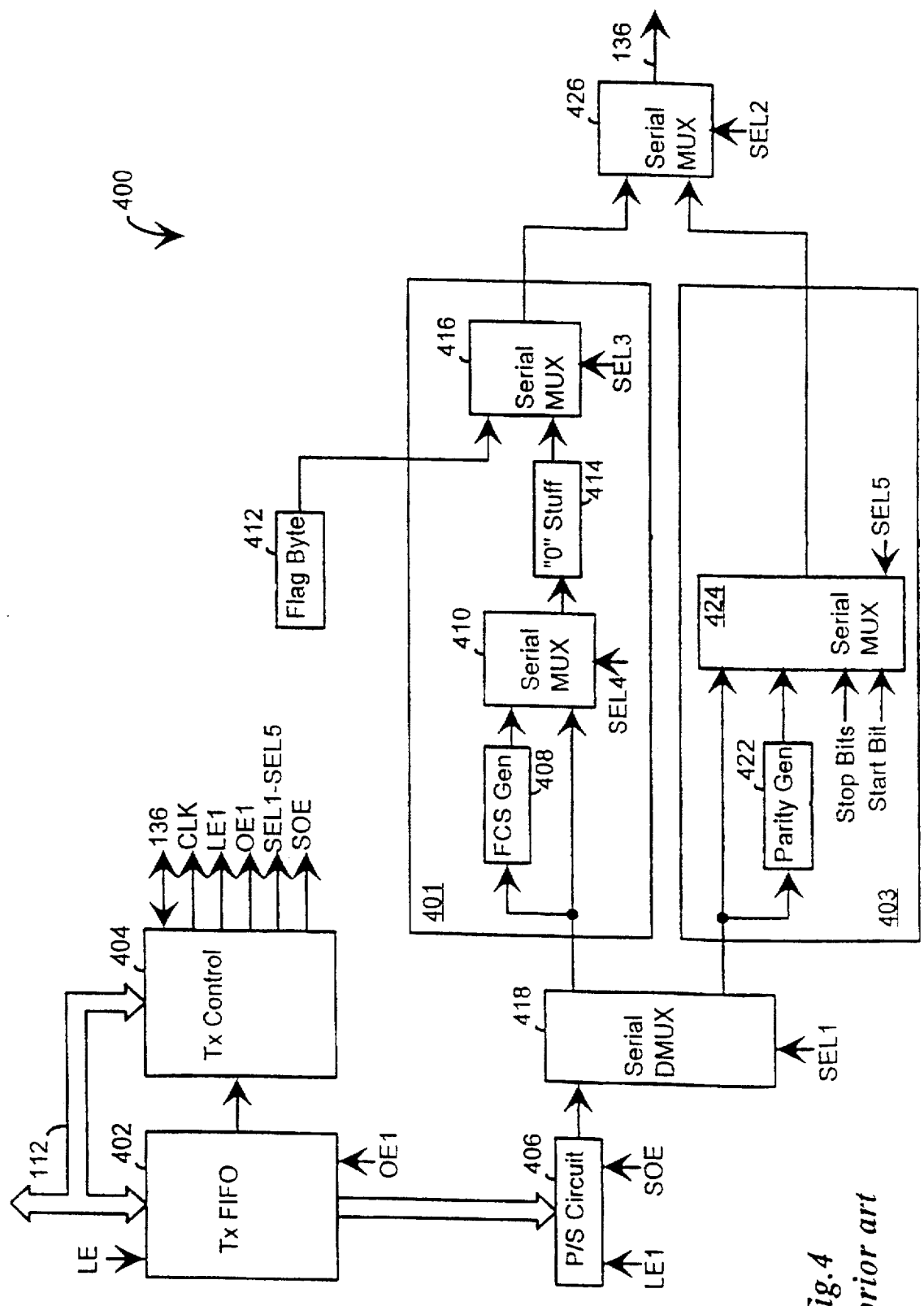
FIG. 4 illustrates, as an example, a block diagram of a prior art transmitter circuit including conventionally configured first and second data paths for respectively transmitting HDLC formatted frames of data and asynchronous mode formatted bytes of data.
Figure 5:
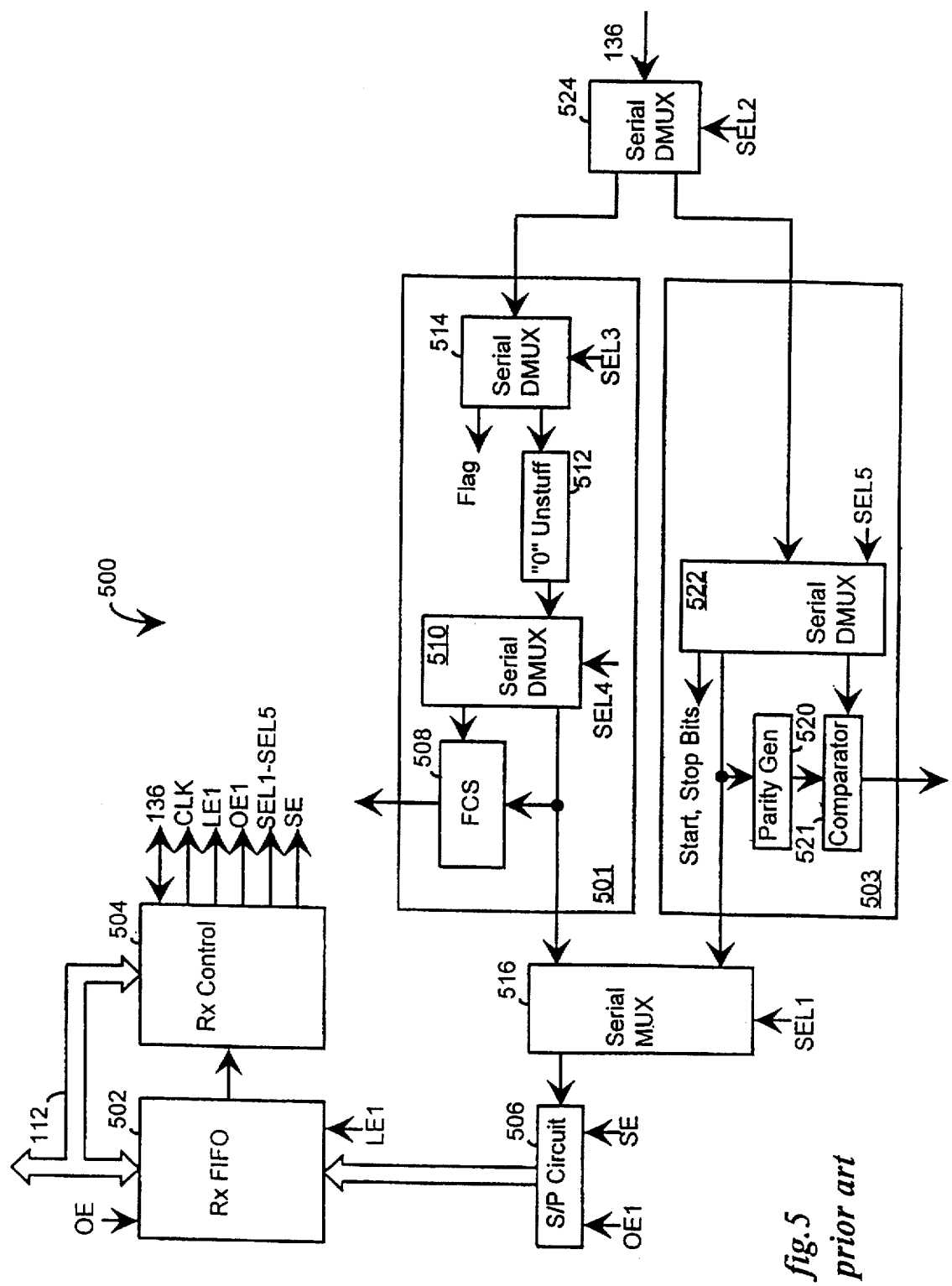
FIG. 5 illustrates, as an example, a block diagram of a prior art receiver circuit including conventionally configured first and second data paths for respectively receiving HDLC formatted frames of data and asynchronous mode formatted bytes of data.
Figure 6:
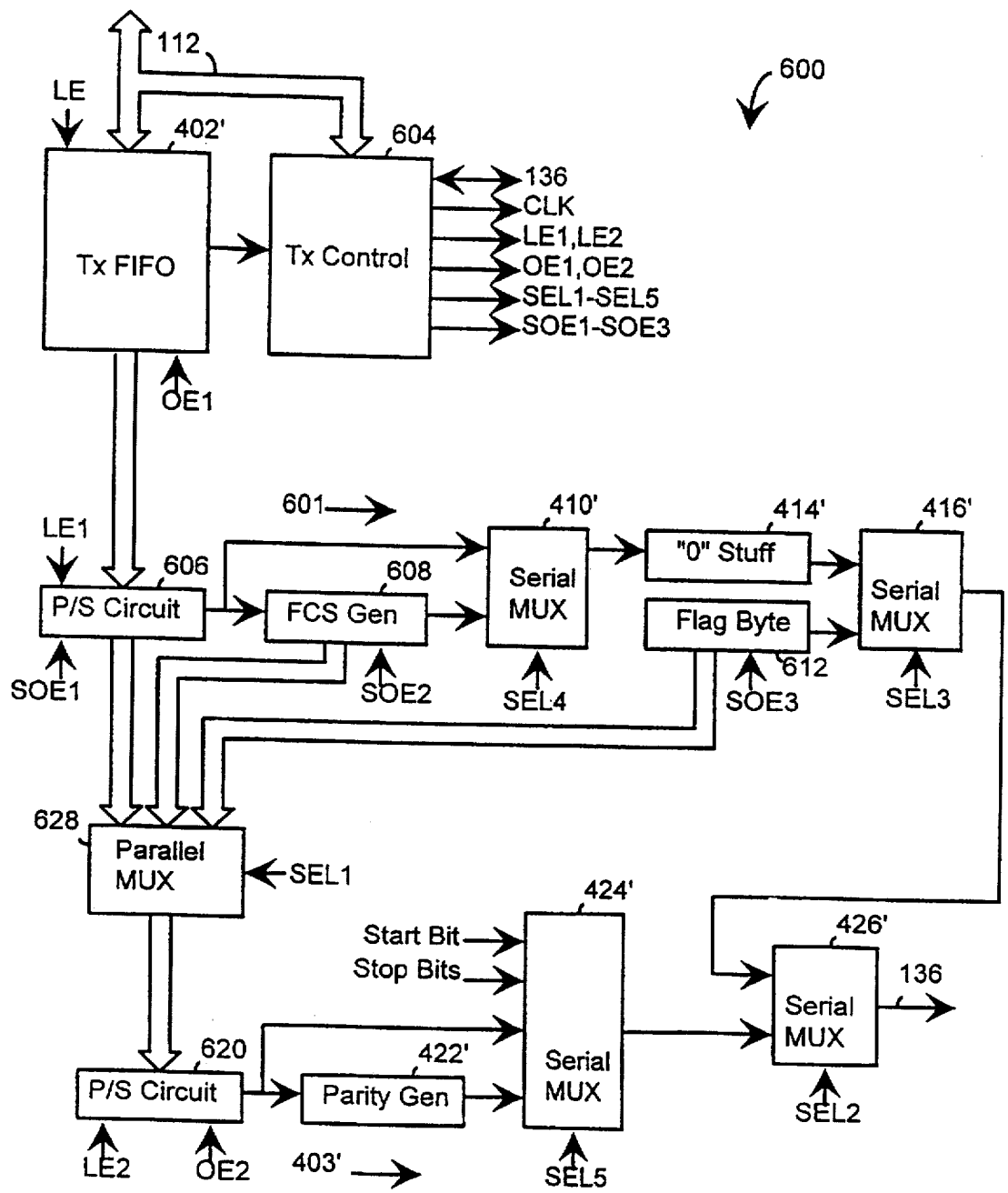
FIG. 6 illustrates, as an example, a block diagram of a transmitter circuit including first and second data paths utilizing aspects of the present invention for respectively transmitting HDLC formatted frames of data and asynchronous mode formatted bytes of data.
Figure 7:
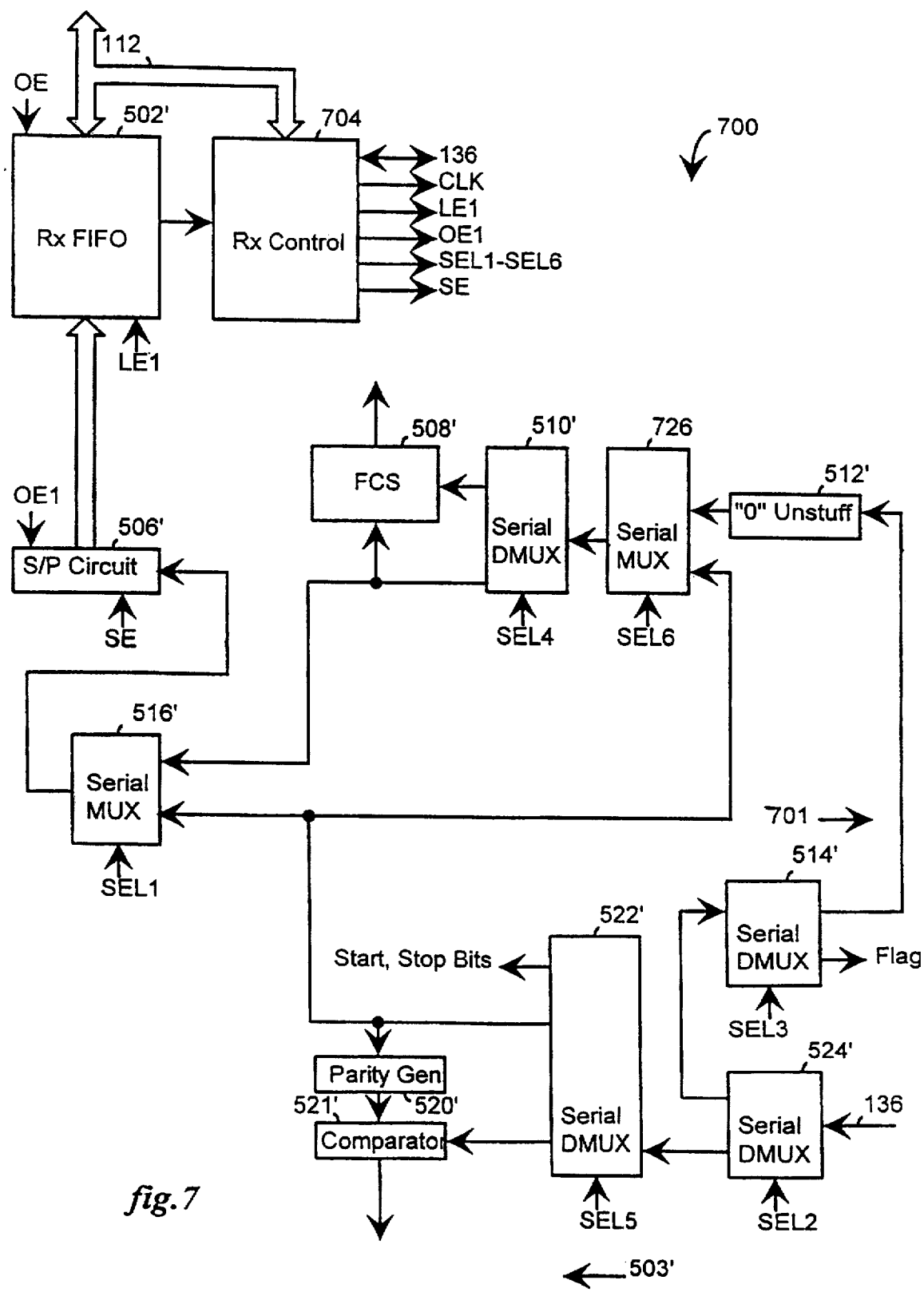
FIG. 7 illustrates, as an example, a block diagram of a receiver circuit including first and second data paths utilizing aspects of the present invention for respectively receiving HDLC formatted frames of data and asynchronous mode formatted bytes of data.

Included in each of the data communication circuits 128–134 are a transmitter circuit (e.g., 400 in FIG. 4 or 600 in FIG. 6) and a receiver circuit (e.g., 500 in FIG. 5 or 700 in FIG. 7). The transmitter circuit, when enabled, receives parallel transferred data from the data buffer pool in the system memory 104 or the local memory 116, converts the parallel received data into a stream of serial data of a selectable protocol, and writes the stream of serial data of the selectable protocol to another computer system or peripheral device coupled to the serial communication channel corresponding to the data communication circuit. The transmitter circuit may be enabled, for example, by either the processor 102 or the local processor 114. The receiver circuit, on the other hand, receives serially transferred data of a given protocol from another computer system or peripheral device connected to the serial communication channel corresponding to the data communication circuit, converts the serially received data of the given protocol into typically, byte-wide words of data, and transmits, when enabled, the words of data to the data buffer pool in the system memory 104 or the local memory 116. Since the data communication circuits 128–134 communicate on one side by parallel data transfers with the local bus 112, and communicate on another side by serial data transfers with corresponding serial communication channels, the transmit and receive circuits within the data communication circuits 128–134 respectively include parallel-to-serial and serial-to-parallel data conversion means.

In the preferred embodiment of the present invention, both the transmitter and receiver circuits communicate data in either a High-level Data Link Control (HDLC) protocol through a first data path, or an asynchronous protocol through a second data path. To facilitate transmission of an asynchronous-HDLC protocol through the second data path, certain error checking circuitry in the first data path are selectably shared with the second data path. It is readily apparent, however, that the teachings and full scope of the present invention are not to be limited to such protocols. In particular, the first data path may be any one or several synchronous protocols including character-oriented, byte-count-oriented, and bit-oriented protocols since each of such protocols employs a check field for checking the integrity of data transmission.

Figure 2:
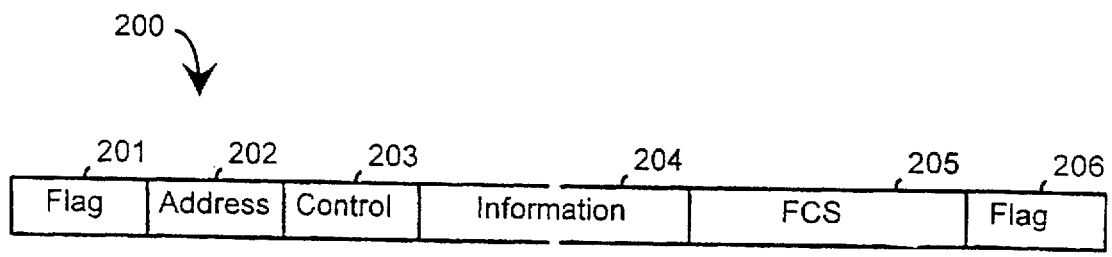
FIG. 2 illustrates, as an example, a frame of synchronously formatted data in the high-level data link control (HDLC) protocol format.

FIG. 2 illustrates, as an example, a frame of synchronously formatted (e.g., HDLC) data 200 including an information field 204 of variable length. Appended before the information field 204 are an opening or initial flag field 201, an address field 202, and a control field 203. The opening flag field 201 indicates the start of the data frame, the address field 202 indicates the address destination of the data frame, and the control field 203 indicates the type of frame being communicated among other things. Appended after the information field 204 are a frame check sequence (FCS) field 205, and a closing or trailing flag field 206. The FCS field 205 contains a value computed from the address, control and information fields which is useful for checking the integrity of a transmission of these fields, and the closing flag field 206 indicates the end of the data frame. Both opening and closing flag fields, 201 and 206, respectively, contain an eight-bit flag character, 01111110 (i.e., a zero, six ones, and another zero) which is generally not allowed to occur anywhere else in the frame by stuffing (i.e., inserting) an extra zero after each five consecutive ones in the address 202, control 203, information 204, and FCS 205 fields.

Figure 3:
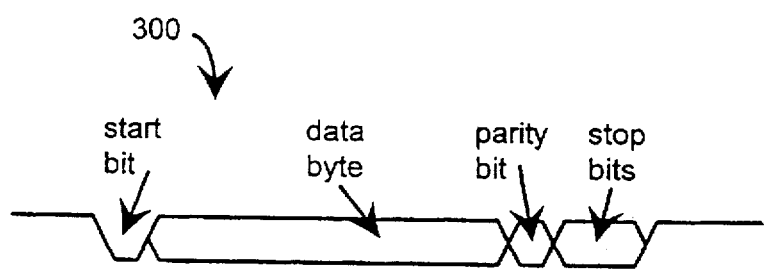
FIG. 3 illustrates, as an example, a byte of asynchronously formatted data in the asynchronous or start-stop protocol format.

FIG. 3 illustrates, as an example, a byte of asynchronously formatted data 300. In asynchronous or start-stop transmission mode, the line idle state is indicated by a voltage level on the line corresponding to the binary "one". A start bit corresponding to the binary "zero" indicates the start of transmission of a character, and one or more stop bits corresponding to the binary "one" indicate the end of transmission of a character. Although a byte of data is depicted as the typical length of a character being transmitted, in practice characters having lengths of 5 to 9 bits can be transmitted, as long as the receiving side knows beforehand the lengths of the characters to be received. As a rudimentary error control, a parity bit may also be calculated at the transmitting end, appended to the character being transmitted, and utilized at the receiving end in the conventional manner.

Asynchronous-HDLC formatted data is a hybrid version of the conventional HDLC formatted data of FIG. 2, and the asynchronously formatted data of FIG. 3. In asynchronous-HDLC formatted data, each byte, regardless of whether it is an opening flag byte, address byte, control byte, data byte, FCS byte, or closing flag byte is treated like any other asynchronous data byte by inserting a start bit before it, and following it with a parity bit and one or more stop bits. A distinguishing feature of asynchronous-HDLC formatted data is that unlike conventional HDLC formatted data, zero stuffing and unstuffing is not performed on the frame of asynchronous-HDLC formatted data.

FIG. 4 illustrates, as an example, a block diagram of a prior art transmitter circuit 400 including a transmitter (TX) control circuit 404; a first-in-first-out (FIFO) memory 402 or other buffering means for buffering data received from the data buffer pool in the system memory 104 or the local memory 116 via local bus 112; a byte-wide parallel-to-serial (P/S) converter circuit 406 for receiving data a byte at-a-time from the FIFO memory 402 under the control of the TX control circuit 404, and converting the received data into a stream of serial data; a serial demultiplexer (DMUX) circuit 418 for receiving the serial data from the P/S converter circuit 406, and passing the data to either a first or second output of the DMUX 418 depending upon the state of a select signal SEL1 provided by the TX control circuit 404; a first data path 401 for conditioning data received from the first output of the DMUX 418 into HDLC formatted frames of data; a second data path 403 for conditioning data received from the second output of the DMUX 418 into asynchronous formatted bytes of data; and a serial multiplexer (MUX) circuit 426 for receiving the conditioned outputs of the first and second data paths, 401 and 403, and selectively passing one or the other to the serial communication channel 136, depending upon the state of a select signal SEL2 provided by the TX control circuit 404.

To form a frame of HDLC formatted data, the first data path 401 includes hardware for appending an opening flag field before each frame of data being transmitted, calculating a frame check sequence (FCS) value for each frame of data being transmitted, stuffing zeroes as appropriate into each frame of data being transmitted, appending such calculated FCS value in a FCS field after the frame of data, and appending a closing flag field after the FCS field for each frame of data being transmitted. To form a byte of asynchronously formatted data, the second data path includes hardware for appending a start bit before each byte of data being transmitted, calculating a parity bit for each byte of data being transmitted, appending the calculated parity bit after the byte of data, and appending one or more stop bits after the parity bit for each byte of data being transmitted.

If a frame of HDLC formatted data is to be transmitted through the first data path 401, the address field (e.g., 202), the control field (e.g., 203), and the information fields (e.g., 204) of the frame of data are stored in the FIFO memory 402 under the cooperative control of the DMA controller unit 118 and the TX control circuit 404. On the other hand, if a frame of asynchronous-HDLC formatted data is to be transmitted through the second data path 403, the opening flag field (e.g., 201), the address field (e.g., 202), the control field (e.g., 203), the information fields (e.g., 204), a FCS field (e.g., 205), and a closing flag field (e.g., 206) are stored in the FIFO memory 402 under the cooperative control of the DMA controller unit 118 and the TX control circuit 404. The P/S converter circuit 406 sequentially receives data a byte-at-a-time from the FIFO memory 402, and provides a serial stream of the received data to the serial DMUX 418 which in turn, passes in response to its select signal SEL1 being in a first logic state, the received serial stream of data to the first data path 401, and in response to its select signal SEL1 being in a second logic state, the received serial stream of data to the second data path 403. Appropriate control signals for performing such functions are generated by the TX control circuit 404, and provided to the P/S converter circuit 406 and serial DMUX 418.

Included in the first data path 401 are a FCS generator circuit 408, a first serial MUX 410, a zero stuffing circuit 414, and a second serial MUX 416. The second serial MUX 416 has a first input connected to a register 412 containing a flag byte (i.e., 01111110), and a second input connected to an output of the zero stuffing circuit 414. The second serial MUX 416 generates a HDLC formatted frame of data at its output by appending opening and closing flag fields before each frame of data being transmitted in response to a select signal SEL3 provided by the TX control circuit 404. In particular, the select signal SEL3 is in a first logic state when the opening flag field is being passed by the second serial MUX 416, the select signal SEL3 is in a second logic state when the frame of data is being passed by the second serial MUX 416, and the select signal SEL3 is back in the first logic state when the closing flag field is being passed by the second serial MUX 416. The FCS generator circuit 408 calculates an FCS value for each frame of data being transmitted, and the first serial MUX 410 appends the FCS value generated by the FCS generator circuit 408 after each frame of data being transmitted in response to a select signal SEL4 provided by the TX control circuit 404. In doing so, the select signal SEL4 is in a first logic state when the frame of data is being passed by the first serial MUX 410, and the select signal SEL is in a second logic state when the FCS value is being passed by the first serial MUX 410.

Included in the second data path 403 is a parity generator circuit 422, and a serial MUX 424. The parity generator circuit 422 calculates a parity bit for each byte of data being transmitted, and the serial MUX 424 appends the parity bit generated by the parity generator circuit 422, a start bit, and one or more stop bits to each byte of data being transmitted in response to one or more select signals SEL5 provided by the TX control circuit 404. In order to generate an asynchronously formatted byte of data such as depicted in FIG. 3, the select signal SEL5 is in a first logic state when the start bit is being passed by the serial MUX 424, in a second logic state when a byte of data received from the serial DMUX 418 is being passed by the serial MUX 424, in a third logic state when the parity bit generated by the parity generator circuit 422 is being passed by the serial MUX 424, and in a fourth logic state when the one or more stop bits are being passed by the serial MUX 424.

FIG. 5 illustrates, as an example, a block diagram of a prior art receiver circuit 500 including a receiver (RX) control circuit 504; a FIFO memory 502 or other buffer means for buffering data to be transmitted to the data buffer pool in the system memory 104 or the local memory 116 via local bus 112; a byte-wide serial-to-parallel (S/P) converter circuit 506 for receiving serial data and transferring the received data a byte-at-a-time to the FIFO memory 502 under the control the RX control circuit 504; a serial DMUX 524 for receiving data from the serial communication channel 136, and selectively passing the data to a first or second output of the serial DMUX 524; a first data path 501 for conditioning HDLC formatted data received from the first output of the serial DMUX 524; a second data path for conditioning asynchronously formatted data received from the second output of the serial DMUX 524; and a serial MUX 516 for selectively passing either data received from the first data path 501 or data received from the second data path 503 to the S/P converter circuit 506, depending upon the state of a select signal SEL1 provided by the RX control circuit 504.

To condition a frame of HDLC formatted data, the first data path 501 includes hardware for stripping the opening flag field before each frame of data being received, unstuffing zeroes as appropriate from each frame of data being received, performing an FCS check to ensure integrity of the data transmission, generating a check signal indicative of such FCS check, stripping the appended FCS field after each frame of data being received, and stripping the closing flag field after each frame of data being received. To condition a byte of asynchronously formatted data, the second data path 503 includes hardware for stripping the start bit before each byte of data being received, calculating a parity bit for each byte of data being received, comparing the thus calculated parity bit against the parity bit appended after the byte of data, generating a parity check signal indicative of such parity bit check, stripping the appended parity bit after the byte of data, and stripping the one or more stop bits after each byte of data being received.

If a frame of HDLC formatted data is to be conditioned by the first data path 501, the serial DMUX 524 passes the frame of data to the first data path 501 in response to a select signal SEL2 provided by the RX control circuit 504 being in a first logic state. On the other hand, if a frame of asynchronous-HDLC formatted data is to be received through the second data path 503, the serial DMUX 524 passes the frame of data to the second data path 503 in response to the select signal SEL2 being in a second logic state. The RX control circuit 504 communicates with the transmitting computer system in a conventional manner to determine beforehand which protocol mode is to be received.

Included in the first data path 501 are a FCS check circuit 508, a first serial DMUX 510, a zero unstuffing circuit 512, and a second serial DMUX 514. The second serial DMUX 514 strips off the flag field from the HDLC formatted data, and passes the remainder to the zero unstuffing circuit 512 in response to a select signal SEL3 provided by the RX control circuit 504. In particular, the second serial DMUX 514 passes the opening and closing flag fields to a first unconnected output when the select signal SEL3 is in a first logic state, and passes the address (e.g., 202), control (e.g., 203), information (e.g., 204), and FCS fields (e.g., 205) to the zero unstuffing circuit 512 when the select signal SEL3 is in a second logic state. The first serial DMUX 510 thereupon receives the output of the zero unstuffing circuit 512, and passes the address (e.g., 202), control (e.g., 203), and information (e.g., 204) fields to a first input of the serial MUX 516 and a first input of the FCS check circuit 508 in response to a select signal SEL4 provided by the RX control circuit 504 being in a first logic state, and passes the FCS field (e.g., 205) to a second input of the FCS check circuit 508 in response to the select signal SEL4 being in a second logic state. The FCS check circuit 508 calculates a FCS value from the address (e.g., 202), control (e.g., 203), information (e.g., 204), and FCS (e.g., 205) fields provided to its first and second inputs, compares the calculated FCS value against a predetermined fixed value to check the integrity of the data transmission, and generates a FCS check signal indicative of the comparison which may set a bit in a appropriate status register (not shown).

Included in the second data path 503 is a parity generator circuit 520, a comparator 521, and a serial DMUX 522. The parity generating circuit 520 calculates a parity bit for each byte of data being received, the comparator 521 compares the calculated parity bit against a parity bit appended to the byte, and the serial DMUX 522 strips the parity bit, a start bit, and one or more stop bits from each byte of data being received in response to one or more select signals SEL5 provided by the RX control circuit 504. In particular, the serial DMUX 522 passes the start and stop bits to a first unconnected output when the select signal SEL5 is in a first logic state, passes the byte of data to a second output of the serial DMUX 522 connected to a second input of the serial MUX 516 and an input of the parity generator circuit 520 when the select signal SEL5 is in a second logic state, and passes the parity bit to a third output of the serial DMUX 522 connected to a first input of the comparator 521 when the select signal SEL5 is in a third logic state. The comparator 521 then compares the calculated parity bit received at a second input from the parity generator circuit 520, against the corresponding parity bit received at its first input from the serial DMUX 522, and generates a parity check signal indicative of such comparison.

FIG. 6 illustrates, as an example, a block diagram of a transmitter circuit 600 utilizing aspects of the present invention for transmitting HDLC formatted frames of data selectively through either a first data path 601 configured for transmitting HDLC formatted frames of data, or a second data path 403' configured for transmitting asynchronous mode formatted bytes of data through the serial communication channel 136. The transmitter circuit 600 results from certain advantageous modifications to the prior art transmitter circuit 400. To simplify the description, identical reference numbers with primes are used to indicate identically functioning parts in the transmitter circuits 600 and 400, so that repetitive descriptions of these parts are unnecessary. For example, the FIFO memory 402', the serial MUX 426', and the second data path 403' of the transmitter circuit 600 function as their unprimed counterparts in the prior art transmitter circuit 400; and serial MUX 410', zero stuffing circuit 414', and serial MUX 416' of the first data path 601 of the transmitter circuit 600 function as their unprimed counterparts in the first data path 401 of the prior art transmitter circuit 400.

Modifications to the prior art transmitter circuit 400 resulting in the improved transmitter circuit 600 include elimination of the serial DMUX 418; changing the output architectures of the P/S circuit 406, FCS generator circuit 408, and flag byte register 412 to include parallel output and serial enable functions as in P/S circuit 606, FCS generator circuit 608, and flag byte register 612; and adding a parallel MUX 628 and a P/S converter circuit 620. A modified version of the TX control circuit 404 is also included as TX control circuit 604 to generate appropriate control signals for the transmitter circuit 600.

The serial DMUX 418 has been eliminated so that the FCS generator circuit 608 receives the address, control and information fields for each frame of data regardless of whether the data is being transmitted through the first data path 601 or the second data path 403'. Since the FCS generator circuit 608 calculates an FCS value for each frame of data from its address, control and information fields and provides it in a FCS field to the second data path 403', this frees up the processor (e.g., 102 or 114) of the transmitting computer system (e.g., 100) from having to do so when asynchronous-HDLC formatted data are being transmitted through the asynchronous data path 403'. Further, since the flag byte register 612 also provides opening and closing flag fields to the second data path 403', this also frees up the processor of the transmitting computer system from having to do so. Accordingly, the processor of the transmitting computer system only needs to provide the address, control and information fields for each frame of asynchronous-HDLC formatted data. Since the FIFO memory 402' does not have to store the opening and closing flag bytes, or the FCS field, memory requirements for transmitting a frame of asynchronous-HDLC formatted data is also less for the transmitter circuit 600 than it is for the prior art transmitter circuit 400.

If a frame of asynchronous-HDLC formatted data is to be transmitted through the second data path 403' of the transmitter circuit 600, the address field (e.g., 200), the control field (e.g., 203), and the information fields (e.g., 204) of the frame of data are stored in the FIFO memory 402' under the cooperative control of the DMA controller unit 118 and the TX control circuit 604. To initiate the transmission of a frame of data through the second data path 403', the contents (i.e., 01111110) of the flag byte register 612 are provided through the parallel output of the flag byte register 612 to a third input of the parallel MUX 628, which passes the flag field to a P/S circuit 620 in response to a select signal (or signals) SEL1 provided by the TX control circuit 604 being in a third logic state. The output enable OE2 of the P/S circuit 620 is thereupon activated by the TX control circuit 604, so that an opening flag field is serially provided to the second data path 403'. The second data path 403' thereupon transmits the opening flag field by inserting a start bit before it, calculating a parity bit and appending the calculated parity bit after it, then appending one or more stop bits after the appended parity bit in the same manner as described for the second data path 403 of the conventional transmitter circuit 400.

The address field is then read out of the FIFO memory 402' and latched into the P/S circuit 606 under the control of the TX control circuit 604. The address field is then made available through the parallel output of the P/S circuit 606 to a first input of the parallel MUX 628, which passes the control field to the P/S circuit 620 in response to the select signal SEL1 provided by the TX control circuit 604 being in a first logic state. The address field is thereupon latched into the P/S circuit 620 by the TX control circuit activating its latch enable LE2. The serial output enable SOE1 of the P/S circuit 606, and the output enable OE2 of the P/S circuit 620 are thereupon both activated, for example, so that the address field is serially provided to both the FCS generator circuit 608 and the second data path 403'. The second data path 403' thereupon transmits the address field in the same manner as described in reference to the opening flag field.

After serially outputting the address field from the P/S circuits 606 and 620, the control field is next read out of the FIFO memory 402 and latched into the P/S circuit 606 under the control of the TX control circuit 604. The control field is then provided through the parallel output of the P/S circuit 606 to the first input of the parallel MUX 628, which passes the control field to the P/S circuit 620 in response to the select signal SEL1 provided by the TX control circuit 604 still being in the first logic state. The control field is thereupon latched into the P/S circuit 620 by the TX control circuit activating its latch enable LE2. The serial output enable SOE1 of the P/S circuit 606, and the output enable OE2 of the P/S circuit 620 are thereupon both activated, for example, so that the control field is serially provided to both the FCS generator circuit 608 and the second data path 403'. The second data path 403' thereupon transmits the control field in the same manner as described in reference to the opening flag field.

After serially outputting the control field from the P/S circuits 606 and 620, the information fields are sequentially read out of the FIFO memory 402 and latched into the P/S circuit 606 under the control of the TX control circuit 604. The information fields are sequentially provided through the parallel output of the P/S circuit 606 to the first input of the parallel MUX 628, which in turn, sequentially passes the information fields to the P/S circuit 620 in response to the select signal SEL1 provided by the TX control circuit 604 remaining in the first logic state. The information fields are thereupon sequentially latched into the P/S circuit 620 by the TX control circuit activating its latch enable LE2. The serial output enable SOE1 of the P/S circuit 606, and the output enable OE2 of the P/S circuit 620 are sequentially activated, for example, so that the information fields are serially provided a byte-at-a-time to both the FCS generator circuit 608 and the second data path 403'. The second data path 403' thereupon sequentially transmits each of the information fields in the same manner as described in reference to the opening flag field.

After sequentially outputting the information fields through the P/S circuits 606 and 620, a FCS field is provided through a parallel output of the FCS generator circuit 608 to a second input of the parallel MUX 628, which passes the FCS field to the P/S circuit 620 in response to the select signal SEL1 provided by the TX control circuit 604 being in a second logic state. The FCS field is then latched in the P/S circuit 620, and serially provided to the second data path 403' by the output enable OE2 being activated by the TX control circuit 604. The second data path 403' thereupon transmits the FCS field in the same manner as described in reference to the opening flag field.

To finish the transmission of the frame of data through the second data path 403', the contents (i.e., 01111110) of the flag byte register 612 are again provided through the parallel output of the flag byte register 612 to the third input of the parallel MUX 628, which passes the flag field to the P/S circuit 620 in response to the select signal SEL1 provided by the TX control circuit 604 being in the third logic state. The output enable OE2 of the P/S circuit 620 is thereupon activated by the TX control circuit 604, so that a closing flag field is serially provided to the second data path 403'. The second data path 403' thereupon transmits the closing flag field in the same manner as described in reference to the opening flag field.

If a frame of HDLC formatted data is to be communicated through the first data path 601, timing of the activations of the serial output enables, SOE1, SOE2 and SOE3, respectively of the P/S circuit 606, the FCS generator circuit 608, and the flag byte register 612 is straightforward. Except for the timing of these serial output enables, operation of the first data path 601 is similar to that described in reference to the first data path 401 of the prior art transmitter circuit 400.

FIG. 7 illustrates, as an example, a block diagram of a receiver circuit 700 including first and second data paths, 701 and 503', for respectively receiving HDLC formatted frames of data (e.g., 200) and asynchronous mode formatted bytes of data (e.g., 300). As with the transmitter circuit 600, the receiver circuit 700 results from certain advantageous modifications to the prior art receiver circuit 500. To simplify the description, identical reference numbers with primes are used to indicate identically functioning parts in the receiver circuits 700 and 500, so that repetitive descriptions of these parts are unnecessary. For example, the FIFO memory 502', the S/P circuit 506', the serial MUX 516', the serial DMUX 524, and the second data path 503' of the receiver circuit 700 function as their identically referenced counterparts in the prior art receiver circuit 500, and the serial DMUX 514', the zero unstuffing circuit 512', the serial DMUX 510', and the FCS check circuit 508' of the first data path 701 of the receiver circuit 700 function as their identically referenced counterparts in the first data path 501 of the prior art receiver circuit 500.

The primary modification to the prior art receiver circuit 500 resulting in the improved receiver circuit 700 is the insertion of a serial MUX 726 between the output of the zero unstuffing circuit 512' and the input to the serial DMUX 510'. In particular, the output of the zero unstuffing circuit 512' is connected to a first input of the serial MUX 726, and the output of the second data path 503' is connected to a second input of the serial MUX 726. When data are being communicated through the first data path 701, a select input SEL6 of the serial MUX 726 is placed in a first logic state by a RX control circuit 704 of the receiver circuit 700 so as to pass the output of the zero unstuffing circuit 512' to the input of the serial DMUX 510'. The first data path 701 of the receiver circuit 700 thereupon functions identically as the first data path 501 of the prior art receiver circuit 500. On the other hand, when address, control, information and FCS data are being communicated through the second data path 503', the select input SEL6 of the serial MUX 726 is placed in a second logic state by the RX control circuit 704 so as to pass the output of the second data path 503' to the input of the serial DMUX 510'. When the opening and closing flags are being communicated through the second data path 503', the select input SEL6 of the serial MUX 726 is placed in the first logic state by the RX control circuit 704 so as not to pass the flag byte output of the second data path 503' to the input of the serial DMUX 510'. A modified version of the RX control circuit 504 is also included in the receiver circuit 700 to generate appropriate control signals for the receiver circuit 700.

The serial MUX 726 has been added so that the field check circuit 508' of the first data path 701 can be shared with the second data path 503'. This frees up the processor (e.g., 102 or 114) of the receiving computer system (e.g., 100) from having to perform such field check functions, such as required in utilizing the prior art receiver circuit 500.

When receiving a frame of HDLC formatted data through the second data path 503', the second data path 503' first conditions the received bytes of data as described in reference to its counterpart 503 in the prior art receiver circuit 500. The conditioned opening flag field is passed through the serial MUX 516' to the S/P circuit 506' by its select signal SEL1 being placed in a second logic state by the RX control circuit 704, and is not passed through the serial MUX 726 to the serial DMUX 510' by its select signal SEL6 being placed in the first logic state by the RX control circuit 704. The opening flag field is then stored in the FIFO memory 502' in the conventional manner under the control of the RX control circuit 704. The conditioned address, control, information and FCS fields are then passed a-byte-at-a-time through both the serial MUX 516' to the S/P circuit 506' and through the serial MUX 726 to the serial DMUX 510' by their respective select signals SEL1 and SEL6 being placed in their second logic states by the RX control circuit 704. The serial DMUX 510' and the FCS check circuit 508' then performs error checking in the same manner as described in reference to unprimed counterparts in FIG. 5, while the address, control, information, and FCS fields are stored in the FIFO memory 502' from the second data path 503' through the serial MUX 516' and the S/P circuit 506' under the control of the RX control circuit 704 in the same manner as described in reference to their unprimed counterparts in FIG. 5. Finally, the conditioned closing flag field is passed through the serial MUX 516' to the S/P circuit 506' by its select signal SEL1 being placed in the second logic state by the RX control circuit 704, and is not passed through the serial MUX 726 to the serial DMUX 510' by its select signal SEL6 being placed back in the first logic state by the RX control circuit 704. The closing flag field is then stored in the FIFO memory 502' in the conventional manner under the control of the RX control circuit 704.

Although the various aspects of the present invention have been described with respect to preferred embodiments, it will be understood that the invention is entitled to full protection within the full scope of the appended claims.

We claim:

1. A data communication circuit comprising:

a first data path configured for communicating data in a synchronous data link control mode, said first data path including a field check circuit;

a second data path configured for communicating data in an asynchronous data link control mode, said second data path switchably coupled to said field check circuit; and control means coupled to said first and second data paths, for selectively passing communication data through either said first or second data path, and switchably coupling said second data path to said field check circuit of said first data path when said second data path is asynchronously communicating data formatted in a synchronous data link control format.

2. The data communication circuit as recited in claim 1, said data communication circuit having a transmitter circuit including said first data path, said second data path, and said control means, wherein said second data path comprises:

a first multiplexer circuit having an output, a first input coupled to a data bus for receiving data to be communicated by said second data path, a second input coupled to said field check circuit of said first data path, and a select input coupled to said control means for selectively passing data received at said first and second inputs of said first multiplexer circuit to said first multiplexer circuit output;

a parity bit generator circuit coupled to said first multiplexer circuit output for generating a parity bit for each byte of data being passed by said first multiplexer circuit output; and a second multiplexer circuit having an output coupled to a serial communication channel for transmitting data to be communicated by said second data path, a first input coupled to a start bit, a second input coupled to at least one stop bit, a third input coupled to said first multiplexer circuit output, a fourth input coupled to said parity bit generator circuit for receiving said generated parity bit, and a select input coupled to said control means for selectively passing data received at said first, second, third and fourth inputs of said second multiplexer circuit to said second multiplexer circuit output.

3. The data communication circuit as recited in claim 2, wherein said field check circuit has an input coupled to said data bus and an output providing a field check value, and said first data path comprises a third multiplexer circuit having an output coupled to said serial communication channel, a first input coupled to said data bus for receiving data to be communicated by said first data path, a second input coupled to said field check circuit for receiving said generated field check value, and a select input coupled to said control means for selectively passing data received at said first and second inputs of said third multiplexer circuit to said third multiplexer circuit output.

4. The data communication circuit as recited in claim 3, wherein said first data path further comprises a fourth multiplexer circuit having an output coupled to said serial communication channel, a first input coupled to said third multiplexer circuit output, a second input coupled to a flag register containing a flag byte, and a select input coupled to said control means for selectively passing data received at said first and second inputs of said fourth multiplexer circuit to said fourth multiplexer circuit output.

5. The data communication circuit as recited in claim 4, wherein said first multiplexer circuit of said second data path further has a third input coupled to said flag register, and said select signal of said first multiplexer is coupled to said control means for selectively passing data received at said first, second and third inputs of said first multiplexer circuit to said first multiplexer circuit output.

6. The data communication circuit as recited in claim 1, said data communication circuit having a receiver circuit including said first data path, said second data path, and said control means, wherein said second data path comprises:

parity bit checking means having first and second inputs, for calculating a parity bit for each byte of data being received at said first input, comparing said calculated parity bit against a corresponding parity bit received at said second input, and generating a parity check signal indicative of said comparison; and a first demultiplexer circuit having an input coupled to a serial communication channel for receiving data to be communicated by said second data path, a first output coupled to a data bus and said first input of said parity bit checking means, a second output connected to said second input of said parity bit checking means, and a select input coupled to said control means for selectively passing data received at said first demultiplexer circuit input to a selected one of said first and second outputs of said first demultiplexer circuit such that said first demultiplexer circuit input passes each received byte of data to said first output, and passes each parity bit corresponding to each received byte of data to said second output.

7. The data communication circuit as recited in claim 6, wherein said first data path comprises:

a first multiplexer circuit having an output, a first input coupled to said serial communication channel, a second input coupled to said second output of first demultiplexer circuit, and a select input coupled to said control means for selectively passing data received at said first and second inputs of said first multiplexer circuit to said first multiplexer circuit output; and a second demultiplexer circuit having an input coupled to said output of said first multiplexer circuit, a first output coupled to said data bus and a first input of said field check circuit, a second output coupled to a second input of said field check circuit, and a select signal coupled to said control means for selectively passing data received at said second demultiplexer circuit input to a selected one of said first and second outputs of said second demultiplexer circuit.

8. The data communication circuit as recited in claim 7, wherein said field check circuit generates a check value from data received at said first and second inputs of said field check circuit, compares said check value against a predetermined value, and generate a field check signal indicative of such comparison.

9. The data communication circuit as recited in claim 8, further comprising a third demultiplexer circuit having an input coupled to said serial communication channel, a first output coupled to said first multiplexer circuit input, a second unconnected output for stripping opening and closing flag fields from received data, and a select input coupled to control means for selectively passing data received at said third demultiplexer input to a selected one of said first and second outputs of said third demultiplexer circuit.

10. A computer system comprising:

a processor; and a data communication circuit coupled to said processor through a data bus, said data communication circuit including a first data path configured for communicating data in a synchronous data link control mode, said first data path including a field check circuit;

a second data path configured for communicating data in an asynchronous data link control mode, said second data path switchably coupled to said field check circuit; and control means coupled to said first and second data paths, for selectively passing communication data through either said first or second data path, and switchably coupling said second data path to said field check circuit of said first data path when said second data path is asynchronously communicating data formatted in a synchronous data link control format.

11. The computer system as recited in claim 10, said data communication circuit having a transmitter circuit including said first data path, said second data path, and said control means, wherein said second data path comprises:

a first multiplexer circuit having an output, a first input coupled to a data bus for receiving data to be communicated by said second data path, a second input coupled to said field check circuit of said first data path, and a select input coupled to said control means for selectively passing data received at said first and second inputs of said first multiplexer circuit to said first multiplexer circuit output;

a parity bit generator circuit coupled to said first multiplexer circuit output for generating a parity bit for each byte of data being passed by said first multiplexer circuit output; and a second multiplexer circuit having an output coupled to a serial communication channel for transmitting data to be communicated by said second data path, a first input coupled to a start bit, a second input coupled to at least one stop bit, a third input coupled to said first multiplexer circuit output, a fourth input coupled to said parity bit generator circuit for receiving said generated parity bit, and a select input coupled to said control means for selectively passing data received at said first, second, third and fourth inputs of said second multiplexer circuit to said second multiplexer circuit output.

12. The computer system as recited in claim 11, wherein said field check circuit has an input coupled to said data bus and an output providing an field check value, and said first data path comprises a third multiplexer circuit having an output coupled to said serial communication channel, a first input coupled to said data bus for receiving data to be communicated by said first data path, a second input coupled to said field check circuit for receiving said generated field check value, and a select input coupled to said control means for selectively passing data received at said first and second inputs of said third multiplexer circuit to said third multiplexer circuit output.

13. The computer system as recited in claim 12, wherein said first data path of said data communication circuit further comprises a fourth multiplexer circuit having an output coupled to said serial communication channel, a first input coupled to said third multiplexer circuit output, a second input coupled to a flag register containing a flag byte, and a select input coupled to said control means for selectively passing data received at said first and second inputs of said fourth multiplexer circuit to said fourth multiplexer circuit output.

14. The computer system as recited in claim 13, wherein said first multiplexer circuit of said second data path further has a third input coupled to said flag register, and said select signal of said first multiplexer is coupled to said control means for selectively passing data received at said first, second and third inputs of said first multiplexer circuit to said first multiplexer circuit output.

15. The computer system as recited in claim 10, said data communication circuit having a receiver circuit including said first data path, said second data path, and said control means, wherein said second data path comprises:

parity bit checking means having first and second inputs, for calculating a parity bit for each byte of data being received at said first input, comparing said calculated parity bit against a corresponding parity bit received at said second input, and generating a parity check signal indicative of said comparison; and a first demultiplexer circuit having an input coupled to a serial communication channel for receiving data to be communicated by said second data path, a first output coupled to a data bus and said first input of said parity bit checking means, a second output connected to said second input of said parity bit checking means, and a select input coupled to said control means for selectively passing data received at said first demultiplexer circuit input to a selected one of said first and second outputs of said first demultiplexer circuit such that said first demultiplexer circuit input passes each received byte of data to said first output, and passes each parity bit corresponding to each received byte of data to said second output.

16. The computer system as recited in claim 15, wherein said first data path comprises:

a first multiplexer circuit having an output, a first input coupled to said serial communication channel, a second input coupled to said second output of first demultiplexer circuit, and a select input coupled to said control means for selectively passing data received at said first and second inputs of said first multiplexer circuit to said first multiplexer circuit output; and a second demultiplexer circuit having an input coupled to said output of said first multiplexer circuit, a first output coupled to said data bus and a first input of said field check circuit, a second output coupled to a second input of said field check circuit, and a select signal coupled to said control means for selectively passing data received at said second demultiplexer circuit input to a selected one of said first and second outputs of said second demultiplexer circuit.

17. The computer system as recited in claim 16, wherein said field check circuit generates a field value from data received at said first and second inputs of said field check circuit, compares said generated field value against a predetermined value, and generates a field check signal indicative of such comparison.

18. The computer system as recited in claim 17, further comprising a third demultiplexer circuit having an input coupled to said serial communication channel, a first output coupled to said first multiplexer circuit input, a second unconnected output for stripping opening and closing flag fields from received data, and a select input coupled to control means for selectively passing data received at said third demultiplexer input to a selected one of said first and second outputs of said third demultiplexer circuit.

* * * * *

UNITED STATES PATENT AND TRADEMARK OFFICE
CERTIFICATE OF CORRECTION

PATENT NO : 5,761,465
DATED : June 2, 1998
INVENTOR(S) : Hanumanthrao V. Nimishakavi et al.

It is certified that error appears in the above-identified patent and that said Letters Patent are hereby corrected as shown below:

On title page, item 1 Inventor Name
  replace "Nimishakvi"
  with --Nimishakavi--.

Signed and Sealed this

Seventeenth Day of November, 1998

Attest:

BRUCE LEHMAN

Attesting Officer

Commissioner of Patents and Trademarks